Patented Dec. 26, 1922.

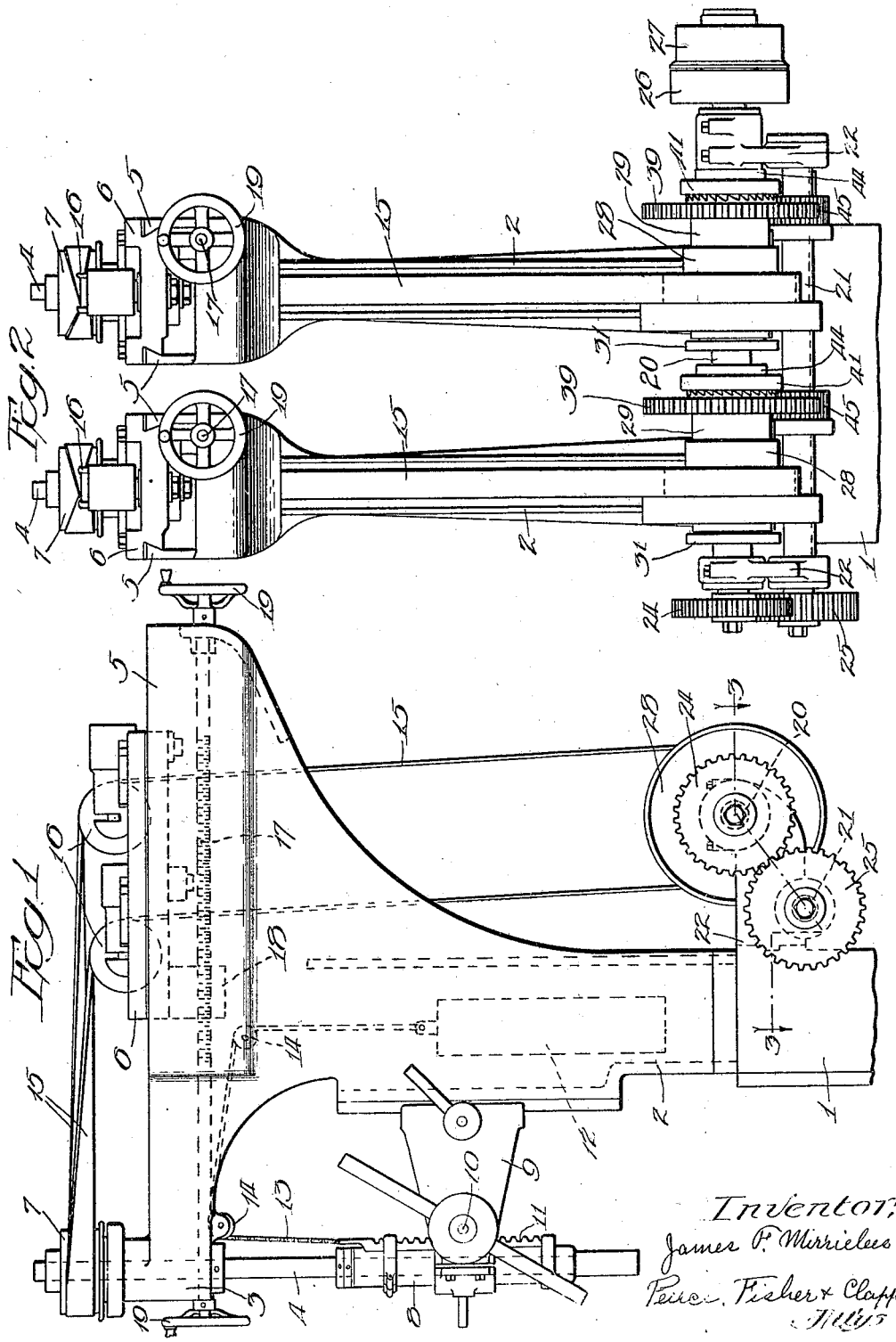

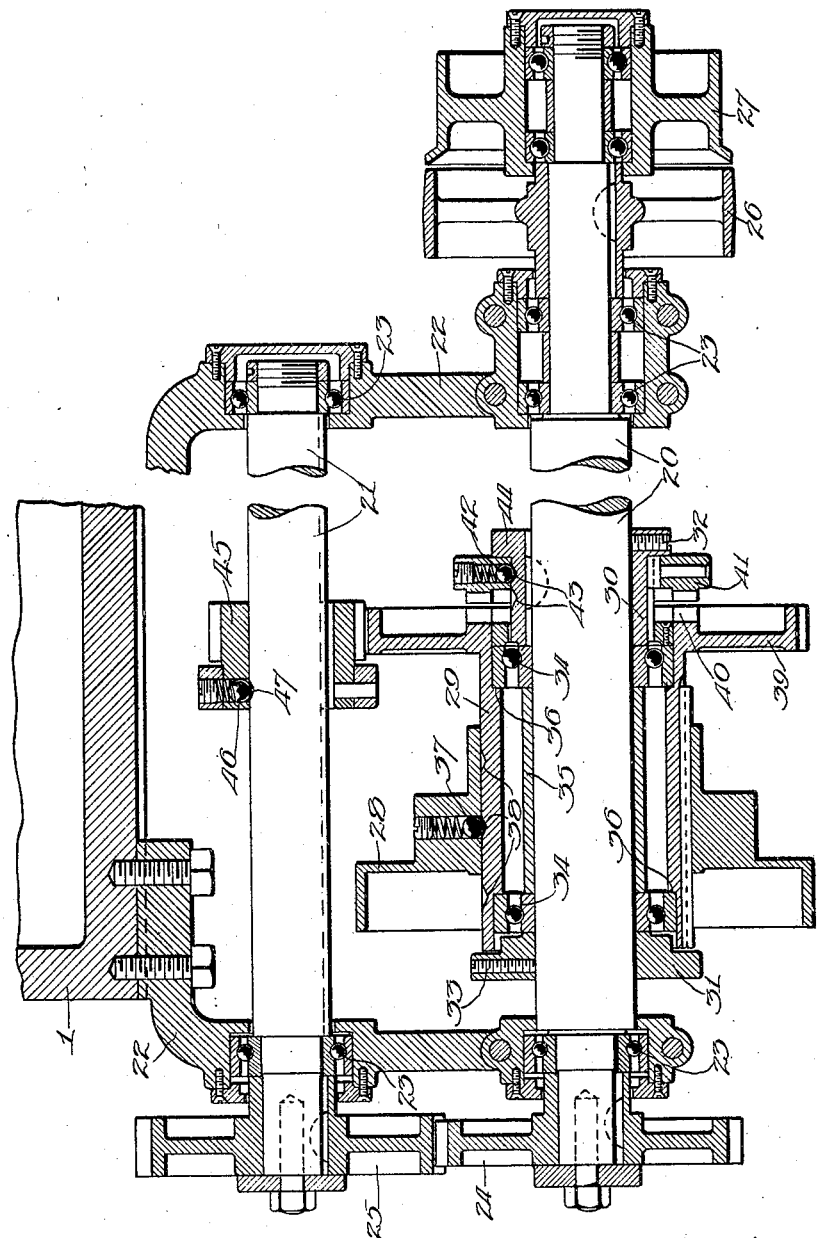

1,439,747

UNITED STATES PATENT OFFICE.

JAMES F. MIRRIELEES, OF CINCINNATI, OHIO, ASSIGNOR, BY MESNE ASSIGNMENTS, TO THE AVEY DRILLING MACHINE COMPANY, OF CINCINNATI, OHIO, A CORPORATION OF OHIO.

DRIVE MECHANISM FOR DRILLING AND LIKE MACHINES.

Application filed September 2, 1919. Serial No. 321,094.

*To all whom it may concern:*

Be it known that I, JAMES F. MIRRIELEES, a citizen of the United States, and a resident of Cincinnati, county of Hamilton, and State of Ohio, have invented certain new and useful Improvements in Drive Mechanisms for Drilling and like Machines, of which the following is a specification.

The invention relates to drive mechanisms for drilling and like machines and seeks to provide a simple construction for driving such machines at a number of different speeds. A further object is to provide a construction that can be conveniently employed for driving the separate drill spindles of multiple drilling machines at different speeds.

The invention consists in the features of improvement hereinafter set forth, illustrated in the preferred form in the accompanying drawings and more particularly pointed out in the appended claims.

In the drawing, Figure 1 is a side elevation of a drilling machine with the improved drive mechanism applied thereto; Figure 2 is a rear view of the same and Figure 3 is an enlarged section on the line 3—3 of Fig. 1.

The machine frame comprises a base portion 1 upon which one or more standards 2 are mounted. Each standard is provided at its upper end with a forwardly projecting portion having a bearing 3 for a vertical drill spindle 4 and with a rearwardly projecting portion having guides 5 for an adjustable idler carriage 6. The spindle, as usual, is vertically movable through the bearing 3 and through a pulley 7 thereon and its lower portion is journaled in a supporting sleeve 8. The latter shifts vertically through a guiding head 9, that is adjustably clamped to the front of the standard 2. The head is provided with the usual feed shaft 10 geared to a rack 11 on the sleeve 8 and a counterweight 12 within the hollow standard is connected by a chain 13 extending over guide rollers 14 to the supporting sleeve 8.

Each drill spindle is driven by an endless quarter-turn belt 15 which passes over the spindle pulley 7 and a pair of idler pulleys 16 on the carriage 6 and thence downwardly to the variable speed drive mechanism at the upper rear portion of the base 1. A horizontal screw shaft 17 journaled in the upper portion of the standard engages a nut 18 on the carriage and is provided at its ends with hand wheels 19, and by rotating the screw the carriage 5 and the idlers thereon can be adjusted to place the belt under proper tension.

The improved variable speed drive mechanism comprises two horizontal countershafts 20 and 21 which extend from one side to the other of the machine and are journaled in brackets 22 which are bolted to and extend rearwardly from the upper portion of the base 1, and which are preferably provided with ball bearings 23 for the shafts. The countershafts may be driven in any suitable manner. Preferably, they are connected together at one side of the machine by gears 24 and 25 keyed thereto and the shaft 20 is connected at its opposite end to a suitable source of power. In the form shown, shaft 20 is provided with tight and loose pulleys 26 and 27 for the reception of a driving belt.

An adjustable stepped or cone pulley 28 is provided for the drive belt 15 of each drill spindle and means are provided whereby each pulley can be separately connected to either one of the countershafts and driven thereby at different speeds. In accordance with the preferred embodiment of the invention, the cone pulleys are mounted on separate hollow shafts or sleeves 29 which are loosely mounted on the shaft 20, being held against longitudinal movement thereon by collars 30 and 31 which are fixed to the shaft 20 by set screws 32 and 33. Collar 30 is also keyed to the shaft 20.

Preferably, as shown in Fig. 3, each pulley-supporting sleeve or hollow shaft 29 is mounted on ball bearings 34 held in place by the collars 30 and 31, and an inner spacing sleeve 35 and shoulders 36 formed in the bore of the pulley-supporting device.

Each stepped pulley 28 is keyed to its sleeve to rotate therewith but is adjustable axially thereon to bring any one of its steps in line with the belt 15 driven thereby. The pulley is held against accidental shift in any one of its adjusted positions by a spring-pressed ball 37 carried by the pulley and arranged to engage any one of a number of seats 38 formed on the sleeve 29.

To connect each sleeve or hollow shaft to either of the countershafts it is provided at one end with a gear 39 and a series of clutch teeth 40. The latter are arranged to be engaged by toothed clutch member 41 which is keyed to the collar 30 but is shiftable axially thereon to engage and disengage the clutch teeth. The clutch 41 is held in engaged and disengaged position by a spring pressed ball 42 carried thereby and arranged to engage either one of two seats 43 formed in the collar. The latter has a flange 44 at its end to prevent the disengagement of the clutch member therefrom.

Each gear 39 is arranged to mesh with a pinion 45 that is keyed to the countershaft 21 but is slidable thereon into and out of engagement with the gear. A spring-pressed ball 46 carried by the pinion is arranged to engage a seat 47 in the shaft to hold the pinion in operative position. By shifting either the clutch 41 or the pinion 45 to operative position and the other part to idle position, the sleeve or hollow shaft 29 and the cone-pulley 28 thereon can be connected directly to the counter shaft 20 or can be connected through the gear 39 and pinion 45 to the countershaft 21 and thus driven at either one of two different speeds. Also, by shifting the cone pulley on the sleeve, its belt can be engaged with any one of its steps and then placed under proper tension by adjusting the idler carriage 6. In this way, the drill spindle can be driven at any one of a number of different speeds—six, with the construction shown—and in a multiple drilling machine, the separate spindles can be driven at different speeds.

Obviously, changes can be made from the details set forth, without departure from the essentials of the invention as set forth in the claims.

I claim as my invention:

1. In a variable speed drive mechanism for drilling machines and the like, the combination with a drive belt, of a stepped drive pulley therefor, said pulley being adjustable axially to bring any one of its steps in line with said drive belt, and means for driving said pulley at different speeds comprising two counter shafts and means for operatively connecting said pulley in any of its adjusted positions to either one of said countershafts and for disconnecting the same from the other of said shafts.

2. In a variable speed drive mechanism for drilling machines and the like, the combination with a drive belt, of a stepped driving pulley therefor, a shaft whereon said pulley is mounted, the latter being connected to rotate with said shaft but being adjustable thereon to bring any one of its steps in line with said belt, two countershafts, and means for connecting said pulley shaft to either one of said countershafts.

3. In a variable speed drive mechanism for drilling machines and the like, the combination with a drive belt, of a stepped driving pulley therefor, a shaft whereon said pulley is mounted, the latter being connected to rotate with said shaft but being adjustable thereon to bring any one of its steps in line with said belt, two countershafts, a clutch for connecting said pulley shaft to one of said countershafts, and gears for connecting said pulley shaft to the other countershaft.

4. In a variable speed drive mechanism for drilling machines and the like, the combination with a drive belt, of a stepped driving pulley therefor, a sleeve whereon said pulley is adjustable to bring any one of its steps in line with said belt, a countershaft whereon said sleeve is loosely mounted, a clutch for connecting said sleeve to said shaft, a second countershaft, and gears for connecting the same to said sleeve.

5. In a variable speed drive mechanism for drilling machines and the like, the combination with a drive belt, of two parallel countershafts, a stepped pulley adjustable on one of said shafts to bring any one of its steps in line with said belt, and means for operatively connecting said pulley in any one of its adjusted positions to either one of said countershafts.

6. In a variable speed drive mechanism for drilling machines and the like, the combination with a drive belt, of two parallel countershafts, a sleeve loosely mounted on one of said countershafts, a stepped pulley keyed to and adjustable on said sleeve to bring any one of its steps in line with said belt, a clutch for connecting said sleeve to the countershaft whereon it is mounted, and gears for connecting said sleeve to the other countershaft.

7. In a variable speed drive mechanism for drilling machines and the like, the combination with a drive belt, of two parallel countershafts geared together, a sleeve loosely mounted on one of said shafts, a stepped pulley keyed to and adjustable on said sleeve to bring any one of its steps in line with said belt, a clutch for connecting said sleeve to the shaft whereon it is mounted, and gears for connecting the sleeve to the other shaft.

8. In variable speed drive mechanism for multiple spindle drilling machines, the combination with a plurality of drive belts, one for each spindle, of a series of stepped pulleys therefor, separate shafts whereon said pulleys are mounted, the latter being connected to rotate with said shafts but being adjustable thereon to bring the steps thereof in line with their respective belts, and means for driving said pulleys at different speeds comprising two countershafts and means for separately connecting said pulley shafts to either one of said countershafts.

9. In variable speed drive mechanism for multiple spindle drilling machines, the combination with a plurality of drive belts, one for each spindle, of a series of stepped pulleys therefor, separate shafts arranged in axial alinement whereon said pulleys are mounted, the latter being connected to rotate with said shafts but being independently adjustable thereon to bring the steps thereof into line with their respective belts, and means for driving said pulleys at different speeds comprising two parallel countershafts and means for separately connecting said pulley shafts to either of said countershafts.

10. In variable speed drive mechanism for multiple spindle drilling machines, the combination of a plurality of drive belts, one for each spindle, a series of stepped pulleys therefor, two countershafts for driving said pulleys at different speeds, the latter being independently adjustable on one of said countershafts to bring the steps thereof in line with their respective belts, and means for separately connecting and disconnecting said pulleys in any of the different adjusted positions thereof to and from either of said countershafts.

11. In variable speed drive mechanism for multiple spindle drilling machines, the combination of a plurality of drive belts, one for each spindle, a series of stepped pulleys therefor, two parallel countershafts for driving said pulleys at different speeds, the latter being independently adjustable on one of said countershafts to bring the steps thereof in line with their respective belts, and clutches and gears for separately connecting and disconnecting said pulleys in any of the adjusted positions thereof to and from either of said shafts.

12. In variable speed drive mechanism for multiple spindle drilling machines, the combination of a plurality of drive belts, one for each spindle, a series of stepped pulleys therefor, a countershaft, a series of sleeves loosely mounted thereon, said pulleys being keyed to said sleeves and each adjustable on its sleeve to bring any one of its steps in line with the corresponding belt, clutches for separately connecting said sleeves to said shaft, a second parallel countershaft, and sets of gears for separately connecting the same to said sleeves.

13. In variable speed drive mechanism for drilling machines, the combination of a vertical drill spindle, a quarter-turned belt for driving said spindle, a stepped pulley for driving said belt, a horizontal shaft whereon said pulley is mounted, the latter being connected to rotate with said shaft but being axially adjustable thereon to bring any one of its steps in line with said quarter-turned belt, a horizontal driving shaft and adjustable connections between said driving shaft and said pulley shaft for driving the pulley at different speeds in any one of its adjusted positions.

14. In variable speed drive mechanism for multiple spindle drilling machines, the combination of a plurality of vertical drill spindles, quarter turned drive belts one for each of said spindles, stepped pulleys for driving said belts, separate horizontal shafts arranged in axial alignment whereon said pulleys are mounted, the latter being connected to rotate with said shafts but being independently adjustable thereon to bring their steps in line with their respective belts, a drive shaft parallel to said pulley shafts and separate independent connections between each of said pulley shafts and said drive shaft for driving said pulleys at different speeds in any of the adjusted positions thereof.

JAMES F. MIRRIELEES.